United States Patent
Kohli

(10) Patent No.: US 7,068,385 B2
(45) Date of Patent: Jun. 27, 2006

(54) USER CONFIGURABLE CONTROL PANEL CAPABLE OF DISPLAYING INTERNET-DERIVED INFORMATION

(75) Inventor: Akash Kohli, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 984 days.

(21) Appl. No.: 09/790,923

(22) Filed: Feb. 22, 2001

(65) Prior Publication Data

US 2002/0113987 A1   Aug. 22, 2002

(51) Int. Cl.
 *G06F /00* (2006.01)
(52) U.S. Cl. ..................................... 358/1.15; 358/1.13
(58) Field of Classification Search ...................... None
 See application file for complete search history.

(56) References Cited

U.S. PATENT DOCUMENTS

| | | | |
|---|---|---|---|
| 4,929,970 A | 5/1990 | Inui | |
| 4,994,988 A | 2/1991 | Yokoi | |
| 5,121,113 A | 6/1992 | Kedge et al. | |
| 5,365,311 A | 11/1994 | Matsuoka | |
| 5,555,077 A | 9/1996 | Schooley | |
| 5,822,216 A | 10/1998 | Satchell, Jr. et al. | |
| 6,070,988 A | 6/2000 | Okamura | |
| 6,104,500 A * | 8/2000 | Alam et al. ................. | 358/1.15 |
| 6,292,211 B1 * | 9/2001 | Pena ........................ | 348/14.08 |
| 6,628,413 B1 * | 9/2003 | Lee ............................ | 358/1.15 |
| 6,704,774 B1 * | 3/2004 | Terranova ................... | 709/219 |

* cited by examiner

*Primary Examiner*—Gabriel Garcia

(57) ABSTRACT

The printer of the present invention is capable of providing a user with information related to printer function as well as useful information unrelated to printer function using a display screen of the printer control panel. Preferably, the information unrelated to printer function includes information derived from the Internet, such as, for example, information regarding, for example, local, national, or international headlines, current weather reports and forecasts, stock quotes, or other business related information. Such Internet-derived information may be substantially continuously displayed by the printer of the present invention, as long as the printer receives power and is able to maintain a viable Internet connection, thereby substantially increasing the value of the printer when idle.

22 Claims, 6 Drawing Sheets

USER CONFIGURABLE CONTROL PANEL CAPABLE OF DISPLAYING INTERNET-DERIVED INFORMATION

BACKGROUND OF THE INVENTION

1. Field of the Invention

The present invention relates to printers. In particular, the present invention relates to a printer having a control panel capable of facilitating user manipulation of printer function as well as displaying information which is of importance to the user, but unrelated to printer function. More particularly, the present invention relates to a printer capable of displaying useful Internet-derived information as well as information regarding printer function using a display screen included in the printer control panel.

2. Background of the Invention

Printers are well known computer peripherals widely used in both home and business computing environments. State of the art printers offer ever increasing levels of speed, print quality, and easily manipulated format options. Despite, their usefulness, however, printers generally sit idle for most of their service lives. In fact, it is not uncommon for printers to sit idle over 95% of the time they are in service, and, when idle, the value of state of the art printers is generally limited to their ability to process future print jobs as needed. It would therefore be desirable to increase the utility of printers by reducing the amount of idle time.

One approach to improving reducing printer idle time is to provide multi-function printers that integrate one or more additional document processing functions. For example, multi-function printers which integrate copier, scanner, or facsimile capabilities, are well known in the art. However, even multi-function printers sit idle for a significant portion of their service lives, and, as is true of known devices including only printer function, the value of an idle multi-function printer is generally limited to its ability to process future documents as needed. Thus, it would be an improvement in the art to provide a printer offering significant utility even when not executing a print job or other integrated document processing function.

BRIEF SUMMARY OF THE INVENTION

The present invention addresses the forgoing needs by providing a printer capable of providing useful Internet-derived information to users which is unrelated to printer function. As it is used herein, the term "printer" signifies any device capable of providing printer function alone or, alternatively, any device providing printer function in combination with one or more other document processing functions, such as, for example, copying, scanning, or facsimile capabilities.

In each of its embodiments the printer of the present invention includes a control panel including a display screen. The printer of the present invention is capable of substantially continuously providing a user with information related to printer function, as well as useful information unrelated to printer function using the display screen of the control panel. Preferably, the information unrelated to printer function includes information derived from the Internet, such as, for example, information regarding local, national, or international headlines, current weather reports and forecasts, stock quotes, other financial or business related information, or entertainment news and information. As it is used herein, the term "Internet" means a computer-based, interconnected system of computer networks. Such Internet-derived information may be substantially continuously displayed by the printer of the present invention, as long as the printer receives power and is able to maintain a viable Internet connection. Therefore, the printer of the present invention provides valuable information to users even when not performing a document processing function, thereby substantially increasing the value of the printer when idle.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

Figure 1:
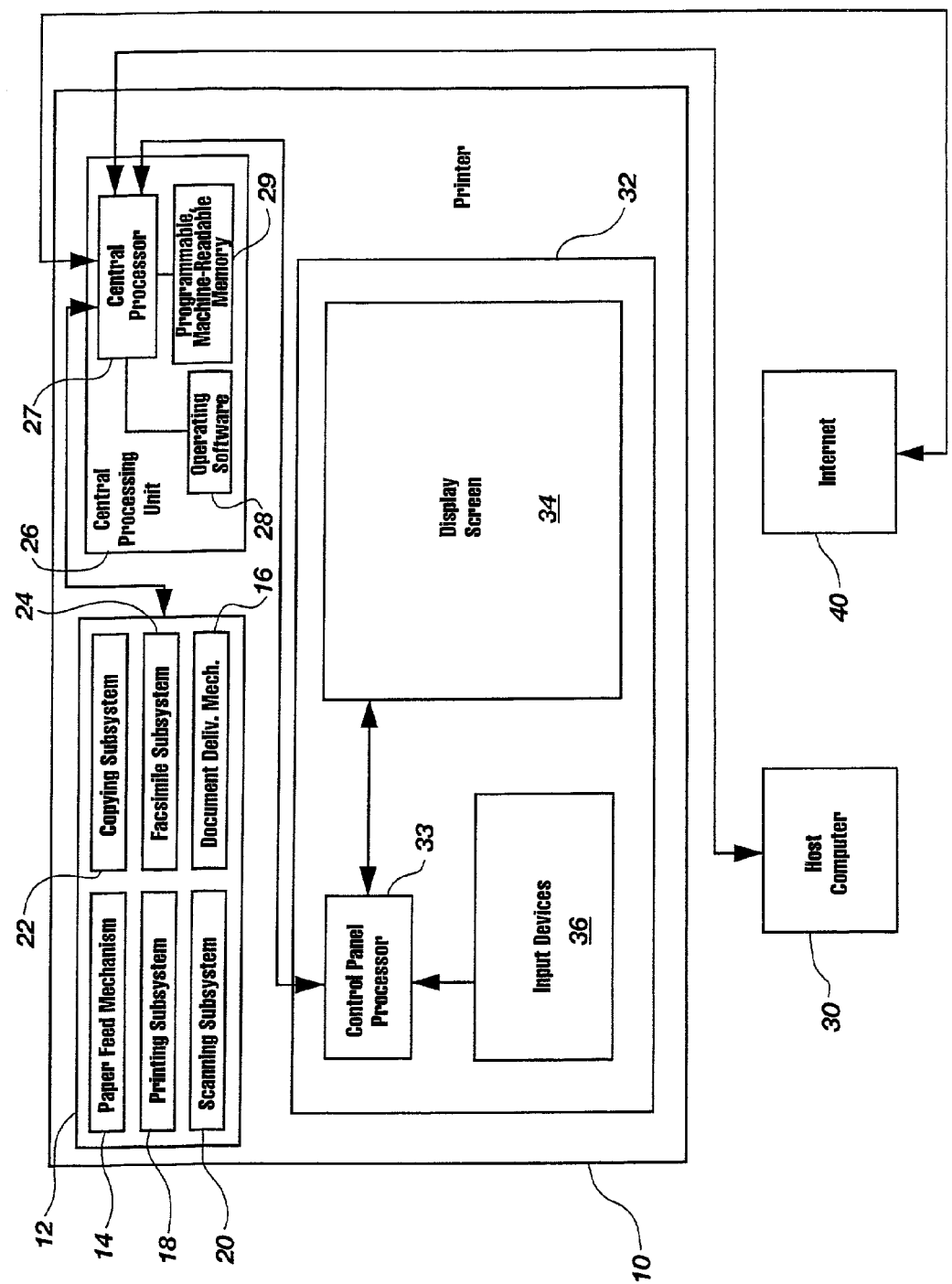
FIG. 1 is a schematic representation of one embodiment of the printer of the present invention.

The printer 10 of the present invention is schematically represented by the diagram provided in FIG. 1. The printer 10 of the present invention incorporates a plurality of subsystems 12 for carrying out printing or other document processing functions. As shown in FIG. 1, the printer 10 includes a paper feed mechanism 14 and a document delivery mechanism 16. As is well known in the art, such feed and delivery mechanisms may include one or more paper trays, rollers, belts, motors, etc., that may be necessary to carry out paper feed and document delivery tasks. The printer 10 of the present invention also includes a printing subsystem 18 including any suitable components necessary for executing print jobs. For example, if the printer of the present invention is a laser printer, the printing subsystem 18 may incorporate a laser optical system as well as image transfer and developing systems, all of which are well known in the art. Further, as shown in FIG. 1, the printer of the present invention may incorporate various other well known document processing subsystems. For instance, the printer of the present invention may include a scanning subsystem 20, a copying subsystem 22, or a facsimile subsystem 24. As is true of the paper feed mechanism 14, the document delivery mechanism 16, and the printing subsystem 18, the components necessary to execute a scanning subsystem 20, a copying subsystem 22, or a facsimile subsystem 24 are well known in the art.

Each of the various subsystems 12 of the printer 10 of the present invention operate under the control of a central processing unit (CPU) 26. Preferably, the CPU 26 includes a central processor 27, which may include a programmable microprocessor or digital signal processor, operating software 28, which includes a web browser or a graphical user interface (GUI), and programmable, machine-readable memory 29, which may include random access memory (RAM) or programmable read only memory (PROM). The CPU 26 is connected to the printer subsystems 12, the control panel 32 of the printer, and a host computer 30, which may comprise a single computer or one or more networked computers, such as a local area network. The various connections between the CPU, the host computer 30, the printer subsystems 12, and the control panel 32 are established using any suitable communication technology allowing communication of data between the CPU 26 and the various connected components.

The CPU 26 receives image data from the host computer 30 for the production of printed documents, or, when included, the CPU 26 may be provided image data from the copying subsystem 22, the scanning subsystem 20, or the facsimile subsystem 24, or other document processing subsystem. If necessary, the CPU 26 converts image data received into digital image data, and, in all cases, the CPU either controls one or more of the appropriate subsystems 12 of the printer 10 to produce a printed document based on the received image data, or the CPU 26 directs the storage of the received image data within an electronic storage device, such as, for example, the programmable, machine-readable memory 29 included in the CPU 26, a computer disk, or a memory device included in the host computer 30.

The CPU 26 also receives condition data transmitted from each one of the various subsystems 12 included in the printer. Such condition data may represent, for example, the current status, settings, tasks, or fault conditions of each of the various subsystems 12. Preferably, the CPU 26 processes such information to determine what particular conditions exist within the various subsystems 12, and, based on the processed data, and the CPU 26 directs the display of appropriate subsystem condition information on the display screen 34. As is well known, the condition information displayed on the display screen 34 may include text, a combination of text and one or more icons or diagrams, or any suitable graphic communicating a desired message.

Based on the condition data received, the CPU 26 may also direct the display screen 34 to display the condition information using one or more of a variety of programmed user menus, as is also known in the art. For example, the CPU 26 may direct the display of printer function menus that instruct a user regarding adjusting or executing a document processing function of the printer 10 using the input devices 36 included in the control panel 32. Alternatively, when a fault condition in one or more of the subsystems is sensed, the CPU 26 may display one or more user menus informing the user regarding the fault conditions and their possible resolution. For example, the CPU may direct the display screen 34 to display menus communicating the source of the fault, directing a user to contact certified technician, or guiding a user through a trouble shooting scenario designed to correct the fault condition.

The input devices 36 included in the control panel 32 may include buttons or keys, switches, joysticks, touch pads, track balls, or any other suitable input device. Where keys or buttons are included as input devices 36, such may exist independent of the display screen 34, or, alternatively, the operating software 28 included in the CPU 26 may direct the creation of computer generated keys within the display screen 34. As is known in the art, a software generated key may be actuated by, for example, touching or applying a minimum pressure within an area of display screen 34 defining the relevant key, or by pointing a cursor over the generated key and actuating the generated key using a cursor input device such as a touch pad, joystick, or trackball. Furthermore, the function of some of the input devices 36 included in the control panel may be dedicated, while the function of other input devices 36 may depend on the operating software 28 included in the CPU 26, the condition data processed by the CPU 26, and the menus, instructions, or other information presented by the display screen 34 in response to the received condition data.

The central processor 27, the operating software 28, and the programmable, machine-readable memory 29 included in the CPU 26 also enable the CPU 26 to request and receive information from the Internet 40 using any suitable communication technology, such as, for example, a traditional modem, cable modem, digital subscriber line, T-1 line, T-3 line, or any suitable wireless technology. In particular, the web browser or GUI included in the operating software 28 of the CPU 26 enables the CPU 26 to upload and download data to and from the Internet 40. Upon initialization of the printer 10, the CPU 26 is programmed to establish and maintain a connection to a pre-programmed Internet site, such as, for example, an Internet site providing local, national, or international news, current weather or weather forecasts, financial or business news, or entertainment news and information, such as reviews, movie listings, or concert or theater schedules, and the CPU 26 directs the display of data received or downloaded from the pre-programmed Internet site on the display screen 34 included in the control panel 32. The CPU 26 is further programmed to maintain the Internet connection while the printer remains turned-on so that, ideally, the printer 10 is capable of continuously displaying Internet-derived information on the display screen 34 while the printer receives power, whether or not the printer is executing a document processing function.

However, it is to be expected that there will be times when the CPU 26 will be unable to maintain a viable connection to a pre-programmed Internet site, even when the printer 10 is properly powered, initialized, and in working order. Such a failure may occur due to a difficulties experienced with, for instance, an Internet service provider, the hardware or software supporting a pre-programmed Internet site, or the communication hardware supporting Internet access. In the event an Internet connection can not be established or is lost while the printer 10 receives power and is properly initialized, the CPU 26 is programmed to automatically attempt to establish contact with a pre-programmed Internet site at timed intervals until a viable connection is achieved. Therefore, despite inevitable access interruptions, the printer 10 of the present invention is capable of substantially continuously maintaining a viable Internet connection and presenting useful, Internet-derived information to a user via the display screen 34, regardless of whether or not the printer is executing a document processing function.

The CPU 26 directs the display of information on the display screen 34 of the control panel 32 by communicating display signals to a control panel processor 33, which may be a digital signal processor or a programmable microprocessor and which may also be independent of or incorporated into the display screen 34 circuitry. Preferably, upon receipt of condition data received from the various subsystems 12 or of data representing Internet-derived information, the CPU 26 processes such data and transmits appropriate display signals to the control panel processor 33. In turn, the control panel processor 33 directs the display screen 34 to produce a display communicating the information corresponding to the display signals transmitted by the CPU 26.

The display screen 34 included in the control panel 32 of the printer 10 of the present invention may include any one of numerous suitable display devices known in the art. For instance, the display screen 34 may include a single color dot matrix liquid crystal display, a single color or multiple color cathode ray tube monitor, or, a flat panel active matrix display, such as a super video graphics adapter active matrix video screen that allows a user to receive printer information and Internet-derived information as text, icons, or even photo realistic images.

It must be emphasized that FIG. 1 provides an extremely simplified representation of the printer 10 of the present invention. As is known to those of skill in the art, each of the subsystems 12 will include a variety of known interrelated components not illustrated in FIG. 1. The CPU 26 and each of the various subsystems may additionally include suitable interface circuits or drivers, as known in the art, enabling efficient execution of document processing functions as well as connection to the Internet 40. Moreover, if necessary, the CPU 26 or control panel 32 may further include a converter for converting the Internet-derived information into a format that can be understood by the circuitry of the display screen 34, and various embodiments of the printer 10 of the present invention may include different types of control panels and CPU's programmed to facilitate different display screen configurations.

In a first embodiment, the printer of the present invention includes a CPU programmed to display printer function information and Internet-derived information in different dedicated areas within the display screen of the control panel. An exemplary control panel and display screen suitable for use in the first embodiment is illustrated in FIG. 2.

Figure 2:
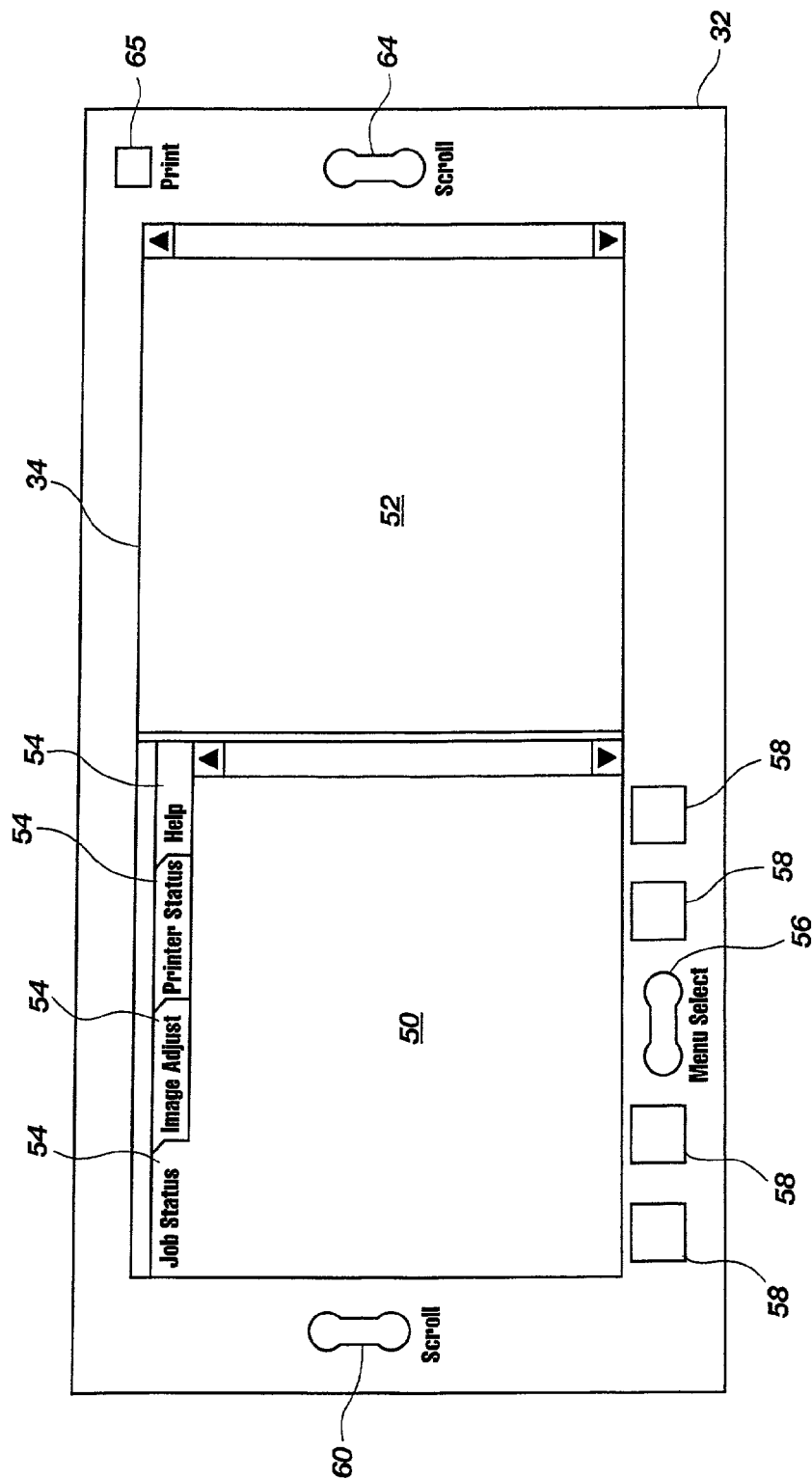
FIG. 2 and FIG. 3 illustrate a control panels useful in conjunction with the first embodiment of the printer of the present invention.

As shown in FIG. 2, the display screen 34 of the control panel 32 of the first embodiment includes a first display area 50 and a second display area 52. The first display area 50 is dedicated to the display of information regarding printer function. As is known in the art, such information may be organized and presented to the user using one or more printer function menus 54. Such printer function menus 54 may present information regarding, for example, the status of pending print jobs, various adjustments that may be made to print quality or characteristics, or the status of the printer or any of its various subsystems. The printer function menus 54 may also include a "Help" menu enabling a user to become familiar with various features of the printer or troubleshoot common faults or failures. The various printer function menus may be selected using a "MENU SELECT" button 56, and the information or options presented within each of the printer function menus 54 may be manipulated or executed using input keys 58 included on the control panel. Moreover, if it is anticipated that a particular printer function menu 54 may include more information than can be reasonably displayed within the first display area 50, a first "SCROLL" key 60 may be provided, which the user can depress in upward pointing or downward pointing directions to scroll through displayed information, as desired.

The second display area 52 of the display screen 34 of the first embodiment is dedicated to the display of Internet-derived information. Internet-derived information is displayed substantially continuously within the second display area 52, and if it is anticipated that the Internet-derived information will be more extensive than can be reasonably displayed within the second display area 52, the CPU may be programmed such that the Internet-derived information automatically scrolls through the second display area 52.

The control panel may also include input devices allowing user manipulation of the Internet-derived information displayed in the second display area 52 of the display screen 34. For example, the control panel 32 may be provided with a second "SCROLL" key 64 enabling the user to scroll through displayed Internet-derived information by pressing the second "SCROLL" key 64 in an upward or downward direction, as desired. Additionally, the control panel 32 may include a "PRINT" key 65. By depressing or otherwise actuating the "PRINT" key 65, the user directs the CPU to control one or more of the various subsystems of the printer of the present invention such that Internet-derived information is printed by the printer. For example, upon actuation of the "PRINT" key 65, the CPU may direct the printing subsystem of the printer to print the information currently displayed in the second display area 52, or, alternatively, upon actuation of the "PRINT" key 65 the CPU may direct the printing subsystem to print the content of an entire page of the Internet site with which the CPU is communicating.

As will be appreciated by those of skill in the art, although the first and second "SCROLL" keys 60, 64, the "MENU SELECT" button 58, the input keys 58, and the "PRINT" key 65 are illustrated in FIG. 2 as input devices independent of the display screen 34, such input devices may also be generated by the operating software of the CPU within an appropriate display area of display screen 34. Again, keys generated by the operating software within the display screen 34 may be actuated by, for example, touching or applying a minimum pressure within the area of the display screen 34 defining the relevant key, or by pointing a cursor over the generated key and actuating the generated key using a cursor input device such as a touch pad, joystick, or trackball.

Figure 3:
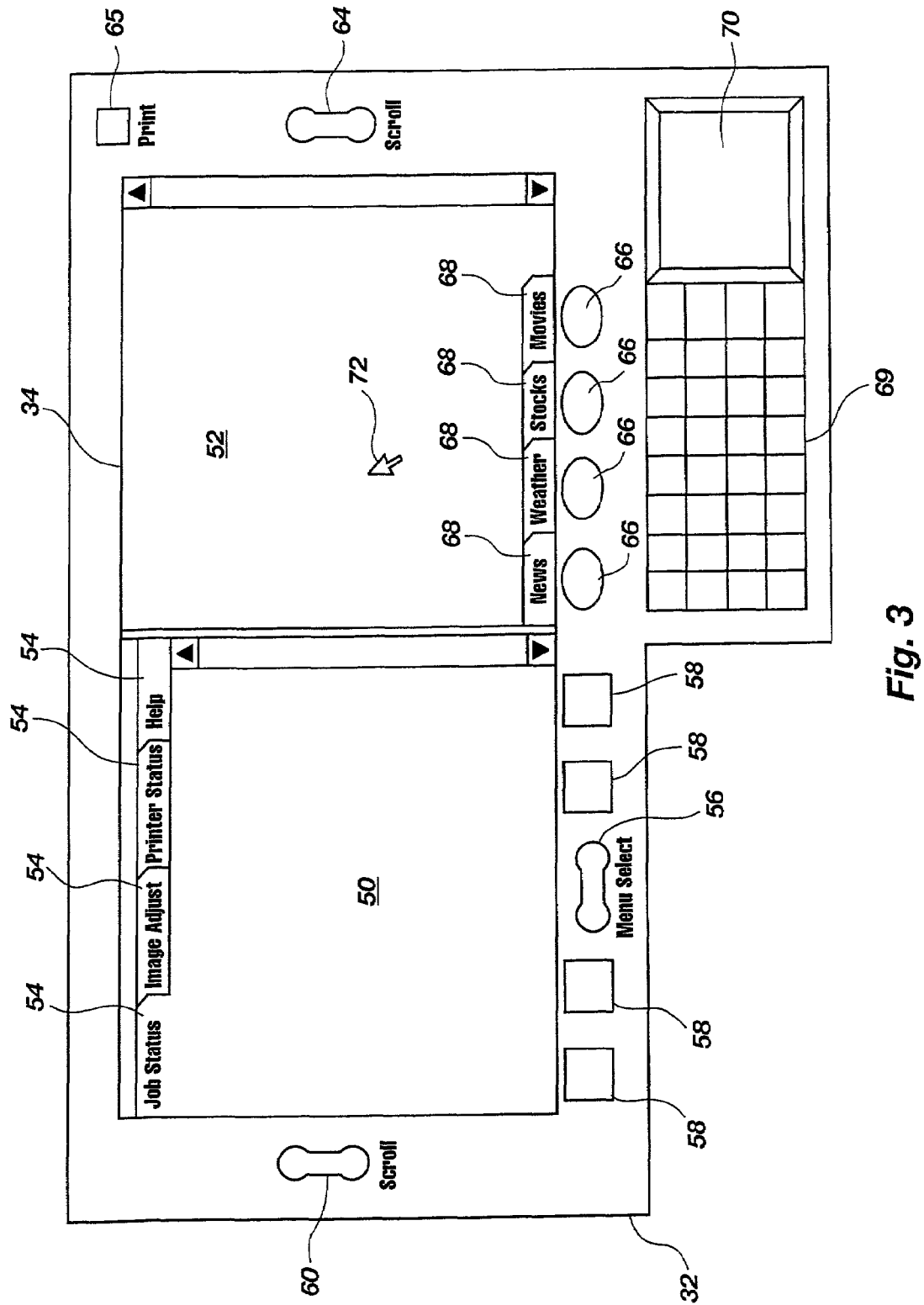

As illustrated in FIG. 3, the control panel 32 of a printer according to the first embodiment may include further input features that provide a user increased Internet interaction. The control panel 32 may include a plurality of selection buttons 66, which, when depressed or otherwise actuated, cause the CPU to automatically contact one of several pre-programmed Internet sites providing desired information. For example, actuation of the selection buttons 66 may direct connection to one of several Internet sites providing local, national, or international news, current weather or weather forecasts, financial or business news, or entertainment news and information, such as reviews, movie listings, or concert or theater schedules. Where such selection buttons 66 are provided, the CPU may be programmed to direct the display of identifiers 68, such as words or icons, within the display screen corresponding to the pre-programmed Internet sited contacted upon actuation of a particular selection button. Thus, the printer of the present invention may be configured to substantially continuously display information derived from one of a plurality of pre-programmed Internet sites, and by using the "PRINT" key 65, a user may use the printer of the present invention to print information derived from any such Internet site.

As is also illustrated in FIG. 3, the control panel 32 of a printer according to the first embodiment of the present invention may also include a keypad 69 or a device for controlling a cursor 72, such as a touch pad 70, a joystick, a trackball, or other device. Using the keypad 69, a user may enter information or instructions, as well as search for, connect to, and print information from additional Internet sites other than those that are accessed automatically by the CPU or by actuating one of the selector buttons 66. By manipulating the cursor 72 with the touch pad 70, a user can easily browse Internet-derived information presented in the second display area 52 of the display screen 34. Moreover, the combined input capabilities of the touch pad 70 and keypad 69 allow a user to manipulate virtually any Internet capability. For example, as is known in the art, electronic mail ("e-mail") may be sent and received using the Internet, and the combined input capabilities of the keypad 69 and touch pad 70 allow a user to access an Internet site providing access to an e-mail account (even if such a site is not pre-programmed into the CPU), select and view e-mail messages sent to an e-mail account, compose and send e-mail messages to other e-mail accounts, or respond, as desired, to received e-mail messages, all using the printer of the present invention. Further, the CPU may also be programmed to enable a user to manipulate various printer functions or settings using the key pad 69 or touch pad 70. Therefore, a printer according to the first embodiment may be configured to facilitate virtually any level of user interaction with the Internet, while allowing a user to manipulate or execute any desired printer function.

Figure 4:
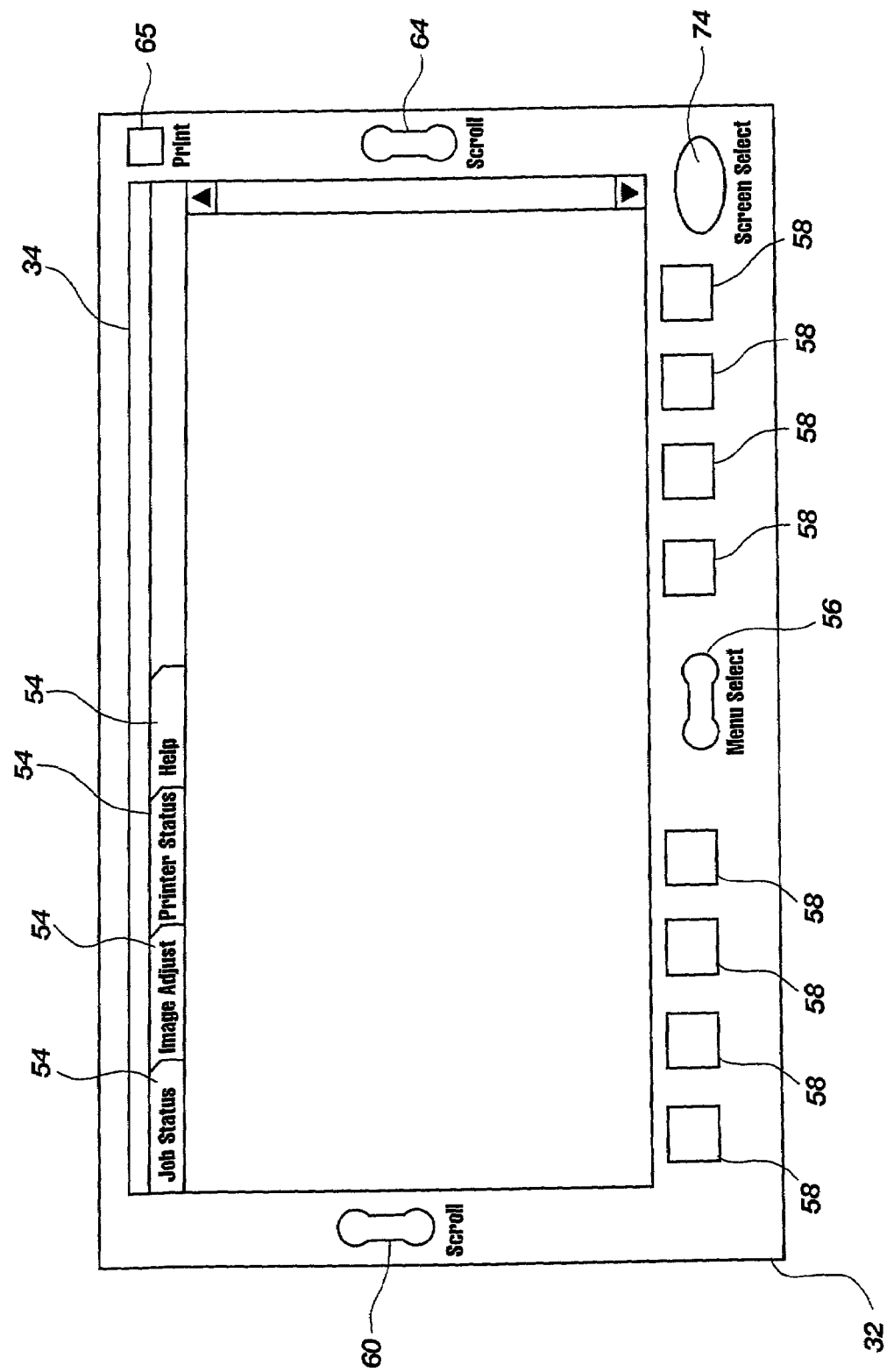
FIG. 4 through FIG. 6 illustrate control panels useful in conjunction with a second embodiment of the printer of the present invention.

In another embodiment, shown in FIG. 4, the printer of the present invention includes a user configurable control panel. The CPU of a printer according to the second embodiment is programmed to allow a user to access one of several display screen configurations. An exemplary control panel useful in conjunction with a printer according to the second embodiment is illustrated in FIG. 4.

As can be seen in FIG. 4 the control panel 32 of a printer according to the second embodiment includes a "SCREEN SELECT" button 74 that allows a user to select one of several programmed display screen configurations. By depressing or otherwise actuating the "SCREEN SELECT" button 74, a user directs the CPU to display one of several programmed display screen configurations, and repeated actuation of the "SCREEN SELECT" button 74 causes the CPU to rotate through various programmed screen configurations.

For example, FIG. 4 illustrates a control panel 32 having a display screen 34 configured in a first configuration which provides only information regarding printer function. As is true of a printer according to the first embodiment, printer function information may be presented using one or more printer function menus 54. Because the entire display screen 34 is dedicated to the display of printer function information, the first configuration may allow a user to more rapidly manipulate printer functions and consider information regarding printer function provided by the CPU. However, upon actuation of the "SCREEN SELECT" button 74, the user directs the CPU to provide a second display screen configuration.

Figure 5:
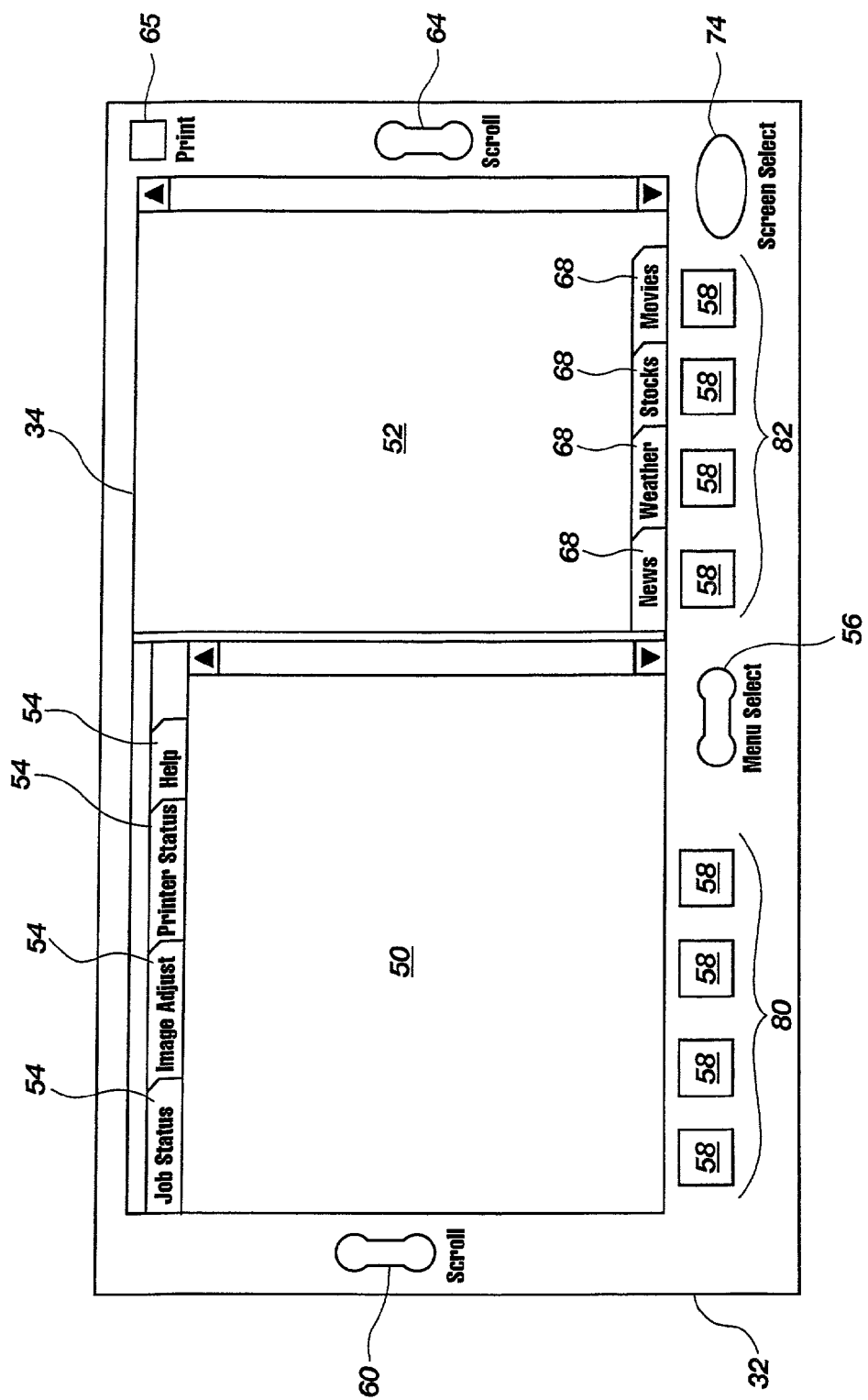

As shown in FIG. 5, the second display screen configuration may include two different display areas, a first display area 50 dedicated to the display of printer function information, and a second display area 52 dedicated to the display of Internet-derived information. This second configuration of the display screen may be advantageous in those instances where a user is operating the printer over an extended period of time and needs to occasionally monitor or adjust printer function, but may also wishes to browse, print, or otherwise manipulate useful Internet-derived information not related to printer function.

Figure 6:
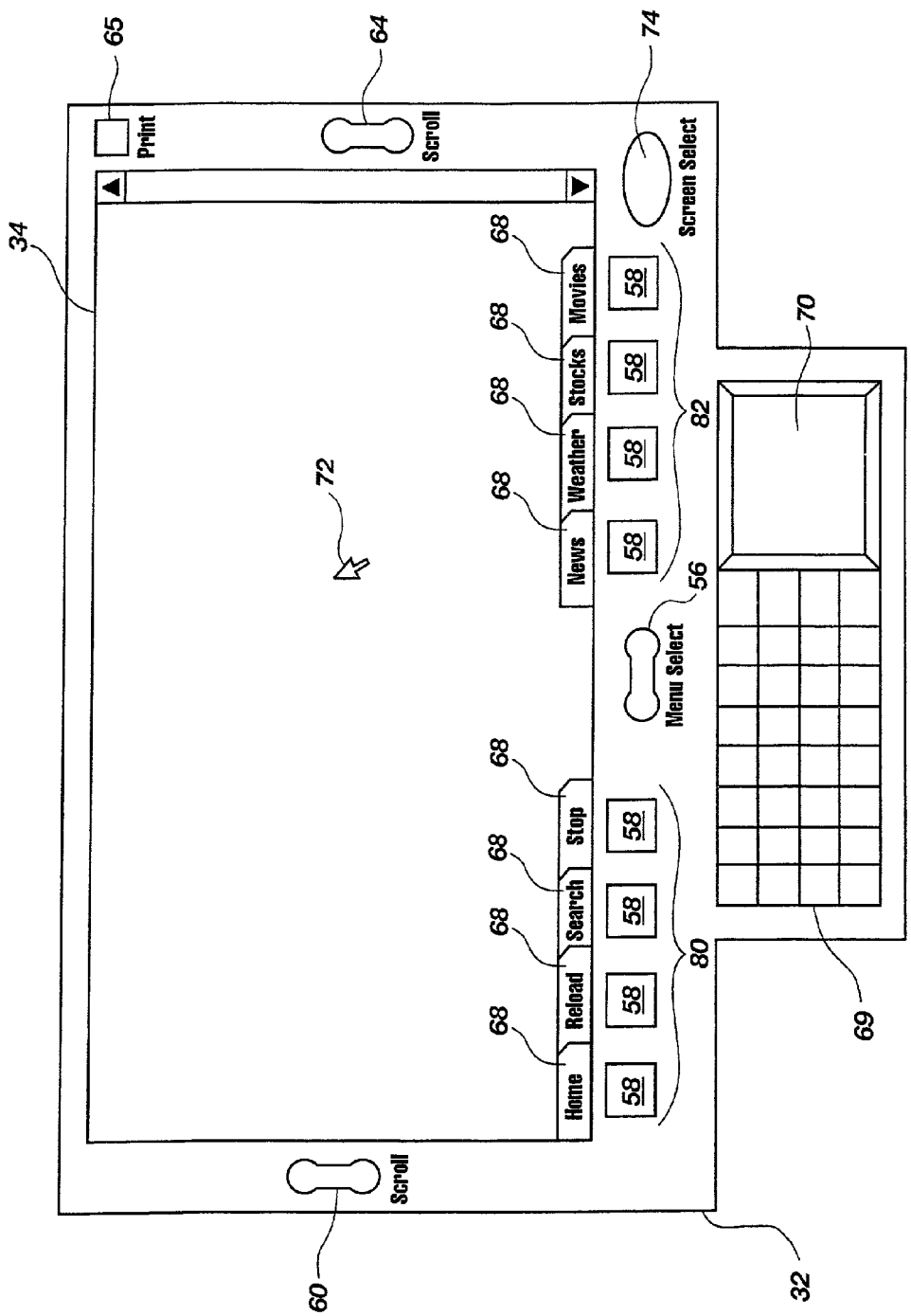

Actuating the "SCREEN SELECT" button 74 a second time, directs the CPU to display yet a third display screen configuration, illustrated in FIG. 6. In this third configuration, the entire display screen 34 is dedicated to the display of Internet-derived information. Such a screen configuration is particularly useful when it is anticipated that printer will sit idle for a time or a user desires to quickly browse, print, or otherwise manipulate a maximum amount of Internet-derived information. Preferably, the CPU of a printer according to the second embodiment of the printer of the present invention is programmed to automatically configure the display screen 34 according to the third configuration after the printer has sat idle after a predetermined amount of time. In doing so, a printer according the second embodiment provides users with increased access to Internet-derived information and ensures the printer's enhanced usefulness when not engaged in a document processing function. Actuating the "SCREEN SELECT" button 74 a third time causes the CPU to again display the first display screen configuration.

As can be seen in FIG. 4 through FIG. 6, the control panel 32 of a printer according the second embodiment of the present invention also includes various input devices. For example, the control panel 32 preferably includes "SCROLL" keys 60,64, a "MENU SELECT" button 56, one or more input keys 58, and a "PRINT" key 65, each of which function as described in relation to the first embodiment. Even though such input devices are illustrated independent of the display screen 34 in FIG. 4 through FIG. 6, as was true in the first embodiment, such input devices of the control panel 32 of the printer according to the second embodiment may also be generated within the display screen by the operating software of the CPU. Moreover, though the function of some of the input devices, such as the two "SCROLL" keys 60, 64, the "MENU SELECT" button 56, and the "PRINT" key 65, may remain constant across each of the different display screen configurations, the function of at least some of the input devices, such as input keys 58, preferably, changes as the display screen 34 is configured as desired by a user or as directed by the CPU.

For instance, the function of input keys 58 may change as the display screen 34 is reconfigured as desired by a user or as automatically directed by the CPU. In the first configuration illustrated in FIG. 4, the CPU may assign each of the input keys 58 one or more functions that allow a user to manipulate various printer function settings presented in the printer function menus 54. In the second configuration illustrated in FIG. 5, the CPU may create a first set of input keys 80 assigned one or more functions allowing a user to manipulate various printer function settings as presented in one or more of the various printer function menus 54, while creating a second set of input keys 82 serving as selection buttons, which, upon actuation, direct the CPU to contact a pre-programmed Internet site. Finally, in the third configuration illustrated in FIG. 6, the CPU may convert all of the input keys 58 into selection buttons, or as shown in FIG. 6, the CPU may create a first set of input keys 80 controlling various additional Internet specific functions, such as, for example, a "HOME" function, a "RELOAD" function, a "SEARCH" function, or a "STOP" function, while creating a second set of input keys 82 serving as selection buttons. The functions and configurations discussed in relation to FIG. 4 through FIG. 6, however, are simply exemplary. The CPU of a printer according to the present invention may be programmed such that the input devices of the control panel 32, including the input keys 58, execute one of any number of desired functions as the display screen is configured or reconfigured by a user or the CPU.

As is illustrated in FIG. 5 and FIG. 6, the CPU may be programmed to direct the display of identifiers 68 indicating the function performed or the nature of the internet site contacted by actuation of the input keys 58 as the display screen 34 is reconfigured. Though they are illustrated in FIG. 5 and FIG. 6 in the form of descriptive words, the identifiers 68 may take on any other suitable form, such as a symbol or icon.

Like the control panel of the first embodiment, the control panel 32 of the second embodiment may include other input devices, such as a keypad 69 or a cursor controlling device, such as a touch pad 70 (illustrated in FIG. 6). The keypad 69 and touch pad 70 enable a user to manipulate virtually any Internet capability or printer function. For example using such input devices, a user may easily browse Internet-derived information, send information or instructions to a contacted Internet site, search for, connect to, and print information from Internet sites which are not accessed automatically by the CPU or accessible using a selection button, or access an e-mail account, select and view e-mail messages, compose and send e-mail messages to other e-mail accounts, or respond, as desired, to received e-mail messages. Further, the CPU may also be programmed to enable a user to manipulate any desired printer function or setting using the key pad 69 or touch pad 70. Thus, like the first embodiment, a printer according to the second embodiment of the present invention may be configured to facilitate virtually any level of user interaction with the Internet, while allowing a user to manipulate or execute any desired printer function.

The embodiments and figures provided and described herein do not limit the scope of the present invention. In each of its various embodiments, the printer of the present invention provides enhanced utility by facilitating substantially continuous user access to useful Internet-derived information, regardless of whether or not the printer is executing a document processing function, and the printer of the present invention may be carried out using embodiments different from those specifically described herein. Therefore, the scope of the present invention is not limited by the description provided by the present specification, but is defined by the appended claims.

What is claimed is:

1. A printer comprising:
   at least one printer subsystem configured to perform a primary function of said printer;
   at least one control panel including a display screen; and
   a central processing unit configured to direct the display of functional information relating to said at least one printer subsystem within a first dedicated display area of said display screen and to display Internet-derived information unrelated to said primary function of the printer within a second dedicated display area of the display screen.

2. The printer of claim 1, wherein said central processing unit includes one of a web browser and a graphical user interface, and said central processing unit is configured to automatically establish a connection to a first pre-programmed Internet site, said Internet-derived information originating from said pre-programmed Internet site.

3. The printer of claim 2, wherein said control panel further comprises a first scroll key configured to enable a user to scroll through said printer function information and a second scroll key configured to enable said user to scroll through said Internet-derived information.

4. The printer of claim 2, wherein said control panel further includes at least one selection button operatively coupled to said central processing unit and configured to cause said central processing unit to connect to a second pre-programmed Internet site.

5. The printer of claim 4, wherein said at least one selection button comprises a plurality of selection buttons operatively coupled to said central processing unit, each of said plurality of selection buttons configured to cause the central processing unit to connect to a different, additional pre-programmed Internet site.

6. The printer of claim 1, wherein said control panel further includes input keys configured to enable a user to manipulate one or more printer functions based on said printer function information displayed within said first dedicated display area.

7. The printer of claim 2, wherein said control panel includes a cursor control device selected from a touch pad, a joystick, and a trackball.

8. The printer of claim 2, wherein said control panel further includes a keypad.

9. The printer of claim 2, further comprising one or more additional document processing subsystems selected from a copying subsystem, a scanning subsystem, and a facsimile subsystem.

10. A printer, comprising:
    at least one printer subsystem configured to perform a primary function of said printer;
    at least one control panel including a user configurable display screen and a screen select button; and
    a central processing unit, the central processing unit capable of establishing and maintaining a connection with a pre-programmed Internet site, directing the display of Internet-derived information unrelated to said at least one printer subsystem within said user configurable display screen, directing the display of functional information relating to said at least one printer subsystem within said user configurable display screen, and directing the reconfiguration of said user configurable display screen to one of a plurality of programmed display screen configurations.

11. The printer of claim 10, wherein, the central processing unit is configured to direct reconfiguration of said user configurable display screen to one of a plurality of configurations upon user actuation of said screen select button, a first configuration of said plurality of configurations dedicated to the display of printer function information, a second configuration of said plurality of configurations, including a first display area dedicated to the display of printer function information and a second display area dedicated to the display of Internet-derived information, and a third configuration of said plurality of configurations dedicated to the display of Internet-derived information.

12. The printer of claim 11, wherein said control panel further comprises at least one scroll key configured to enable the user to scroll through said printer function information or said Internet-derived information displayed within said user configurable display screen.

13. The printer of claim 11, wherein said control panel further includes a plurality of input keys capable of serving one or more functions, said one or more functions depending on the configuration of the user configurable display screen.

14. The printer of claim 13, wherein, when said user configurable display screen is configured in said first configuration, said plurality of input keys are configured to enable the user to manipulate printer function in light of the printer function information presented within the display screen.

15. The printer of claim 13, wherein, when said user configurable display screen is configured in said second configuration, a first set of said plurality of input keys is configured to enable the user to manipulate printer function in light of the printer function information presented within the display screen, while a second set of said plurality of input keys is configured as a plurality of selection buttons capable of causing said central processing unit to connect to a corresponding pre-programmed Internet site.

16. The printer of claim 13, wherein, when said user configurable display screen is configured in said third configuration, a first set of said plurality of input keys is configured as a plurality of selection buttons capable of causing said central processing unit to connect to a corresponding pre-programmed Internet site, while a second set of said plurality of input keys is configured to perform Internet specific functions.

17. The printer of claim 16, wherein said Internet specific functions are selected from a group consisting of a home function, a reload function, a search function, and a stop function.

18. A method for printing Internet-derived information, comprising:

providing a printer including at least one printer subsystem configured to perform a primary function of said printer, a control panel having a display screen, and a central processing unit configured to direct the display of functional information relating to said at least one printer subsystem, the printer being capable of substantially continuously maintaining an Internet connection with an Internet site, presenting Internet-derived information within the display screen, and printing Internet-derived information; and directing the printer to print Internet-derived information by actuating a print key provided at the control panel.

19. A method for using a printer to interact with an Internet site, comprising;

providing a printer including at least one printer subsystem configured to perform a primary function of said printer, a control panel having a display screen and a plurality of input devices, the printer being capable of substantially continuously maintaining an Internet connection with an Internet site and presenting Internet-derived information and presenting functional information relating to said at least one printer subsystem within the display screen;

actuating at least one of said plurality of input devices to manipulate the Internet-derived information presented within the display screen; and reviewing the Internet derived information presented in the display screen.

20. The method according to claim 19, wherein said providing a printer including a control panel having a display screen and a plurality of input devices, comprises providing a control panel wherein at least one of said plurality of input devices is a selection button, the actuation of which directs the printer to contact a pre-programmed Internet site and display information derived from said pre-programmed Internet site within said display screen.

21. The method according to claim 20, wherein said actuating at least one of said plurality of input devices to manipulate the Internet-derived information presented within the display screen comprises actuating said selection button and reviewing said Internet derived information presented in the display screen comprises reviewing the information derived from said pre-programmed Internet site.

22. A method for using a printer to review, compose, send, or respond to electronic mail (e-mail), comprising:

providing a printer including a control panel having a display screen and a plurality of input devices, the printer being capable of retrieving e-mail messages from a first Internet e-mail account, sending electronic mail messages to a second Internet e-mail account, and displaying received or sent e-mail messages within the display screen; and actuating at least one of said plurality of input devices to accomplish one of retrieving an e-mail message from said first Internet e-mail account and sending an e-mail message to said second e-mail account.

* * * * *

UNITED STATES PATENT AND TRADEMARK OFFICE
CERTIFICATE OF CORRECTION

PATENT NO. : 7,068,385 B2  Page 1 of 1
APPLICATION NO. : 09/790923
DATED : June 27, 2006
INVENTOR(S) : Akash Kohli It is certified that error appears in the above-identified patent and that said Letters Patent is hereby corrected as shown below:

In column 10, line 32, in Claim 11, after "configurations" delete ",".

Signed and Sealed this

Sixth Day of July, 2010

David J. Kappos
*Director of the United States Patent and Trademark Office*